(12) United States Patent
Haussila et al.

(10) Patent No.: US 8,782,546 B2
(45) Date of Patent: *Jul. 15, 2014

(54) SYSTEM, METHOD AND GRAPHICAL USER INTERFACE FOR CONTROLLING A GAME

(71) Applicant: Supercell Oy, Helsinki (FI)

(72) Inventors: Timur Haussila, Helsinki (FI); Touko Tahkokallio, Espoo (FI); Mikko Hokkanen, Helsinki (FI)

(73) Assignee: Supercell Oy, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/165,401

(22) Filed: Jan. 27, 2014

(65) Prior Publication Data
US 2014/0143732 A1 May 22, 2014

Related U.S. Application Data

(63) Continuation of application No. 13/445,783, filed on Apr. 12, 2012.

(51) Int. Cl.
| | | |
|---|---|---|
| *G06F 3/041* | (2006.01) | |
| *G06F 3/00* | (2006.01) | |
| *G06F 3/14* | (2006.01) | |
| *G06F 3/048* | (2013.01) | |
| *G06F 3/0482* | (2013.01) | |
| *G06F 3/0488* | (2013.01) | |
| *G06F 3/0481* | (2013.01) | |
| *G06F 17/30* | (2006.01) | |

(52) U.S. Cl.
CPC .......... *G06F 3/0482* (2013.01); *G06F 3/04883* (2013.01); *G06F 2203/04807* (2013.01); *G06F 17/3087* (2013.01); *G06F 3/0481* (2013.01)
USPC ........... 715/769; 715/834; 715/810; 715/863; 345/173

(58) Field of Classification Search
CPC .............. G06F 3/0482; G06F 3/04883; G06F 2203/04807; G06F 17/3087; G06F 3/0481
USPC ........... 715/834, 702, 769, 810, 863; 345/173
See application file for complete search history.

(56) References Cited

U.S. PATENT DOCUMENTS 4,698,625 A * 10/1987 McCaskill et al. ............ 345/157
5,404,442 A * 4/1995 Foster et al. .................. 715/769
(Continued)

FOREIGN PATENT DOCUMENTS

EP 2395419 A2 12/2011

OTHER PUBLICATIONS

International Search Report and Written Opinion; PCT/IB2013/001063; Feb. 6, 2014.

*Primary Examiner* — Jordany Nunez
(74) *Attorney, Agent, or Firm* — Ziegler IP Law Group LLC (57) ABSTRACT

A method in an electronic device includes renders a graphical user interface on the display screen being implemented on a gaming system, presenting one or more selectable graphical objects on the graphical user interface; detecting a selection of one or more of the selectable graphical objects; detecting a selection of an option associated with the selected graphical object; detecting a substantially continuous selection of areas along a path on the graphical user interface, detecting a swipe motion over the graphical user interface; and executing an action corresponding to the selected option in one or more areas along the path on the graphical user interface. The gaming system comprises a farming game, the selectable graphical objects of the graphical user interface comprise different spatial regions of a farming environment in which crops are grown, and the options associated with the selected graphical object comprise farming tools.

20 Claims, 11 Drawing Sheets

(56) References Cited

U.S. PATENT DOCUMENTS

| | | | |
|---|---|---|---|
| 5,471,578 A * | 11/1995 | Moran et al. | 715/863 |
| 5,500,935 A * | 3/1996 | Moran et al. | 715/863 |
| 5,592,608 A * | 1/1997 | Weber et al. | 715/863 |
| 5,596,699 A * | 1/1997 | Driskell | 715/834 |
| 5,598,524 A * | 1/1997 | Johnston et al. | 715/769 |
| 5,608,850 A * | 3/1997 | Robertson | 345/427 |
| 5,689,667 A * | 11/1997 | Kurtenbach | 715/810 |
| 5,701,424 A * | 12/1997 | Atkinson | 715/808 |
| 5,745,717 A * | 4/1998 | Vayda et al. | 715/834 |
| 5,757,383 A * | 5/1998 | Lipton | 345/442 |
| 5,760,773 A * | 6/1998 | Berman et al. | 715/808 |
| 5,798,760 A * | 8/1998 | Vayda et al. | 715/834 |
| 5,828,360 A * | 10/1998 | Anderson et al. | 715/834 |
| 5,835,094 A * | 11/1998 | Ermel et al. | 715/848 |
| 5,861,886 A * | 1/1999 | Moran et al. | 715/863 |
| 5,880,733 A * | 3/1999 | Horvitz et al. | 715/850 |
| 5,926,178 A * | 7/1999 | Kurtenbach | 715/834 |
| 5,943,039 A * | 8/1999 | Anderson et al. | 715/810 |
| 6,037,937 A * | 3/2000 | Beaton et al. | 715/764 |
| 6,094,197 A * | 7/2000 | Buxton et al. | 715/863 |
| 6,144,378 A * | 11/2000 | Lee | 715/767 |
| 6,337,698 B1 * | 1/2002 | Keely et al. | 715/823 |
| 6,456,307 B1 * | 9/2002 | Bates et al. | 715/838 |
| 6,753,888 B2 * | 6/2004 | Kamiwada et al. | 715/782 |
| 6,906,643 B2 * | 6/2005 | Samadani et al. | 340/995.18 |
| 7,088,365 B2 * | 8/2006 | Hashizume | 345/428 |
| 7,093,202 B2 * | 8/2006 | Saund et al. | 715/863 |
| 7,158,878 B2 * | 1/2007 | Rasmussen et al. | 701/431 |
| 7,210,107 B2 * | 4/2007 | Wecker et al. | 715/863 |
| 7,310,619 B2 * | 12/2007 | Baar et al. | 705/50 |
| 7,366,995 B2 * | 4/2008 | Montague | 715/798 |
| 7,373,244 B2 * | 5/2008 | Kreft | 701/532 |
| 7,441,202 B2 * | 10/2008 | Shen et al. | 715/769 |
| 7,546,545 B2 * | 6/2009 | Garbow et al. | 715/769 |
| 7,770,135 B2 * | 8/2010 | Fitzmaurice | 715/856 |
| 7,920,963 B2 * | 4/2011 | Jouline et al. | 701/420 |
| 8,132,125 B2 * | 3/2012 | Iwema et al. | 715/863 |
| 8,133,116 B1 * | 3/2012 | Kelly et al. | 463/31 |
| 8,245,156 B2 * | 8/2012 | Mouilleseaux et al. | 715/834 |
| 8,346,405 B1 * | 1/2013 | Johnson et al. | 701/1 |
| 8,578,295 B2 * | 11/2013 | Chmielewski et al. | 715/834 |
| 8,614,665 B2 * | 12/2013 | Li | 345/156 |
| 8,627,233 B2 * | 1/2014 | Cragun et al. | 715/834 |
| 8,636,594 B2 * | 1/2014 | Derome et al. | 463/37 |
| 2003/0085881 A1 * | 5/2003 | Bosma et al. | 345/173 |
| 2003/0184525 A1 * | 10/2003 | Tsai | 345/173 |
| 2004/0150671 A1 * | 8/2004 | Kamiwada et al. | 345/782 |
| 2004/0263475 A1 * | 12/2004 | Wecker et al. | 345/157 |
| 2005/0028110 A1 * | 2/2005 | Vienneau et al. | 715/834 |
| 2005/0111621 A1 * | 5/2005 | Riker et al. | 378/65 |
| 2005/0134578 A1 * | 6/2005 | Chambers et al. | 345/184 |
| 2005/0270311 A1 * | 12/2005 | Rasmussen et al. | 345/677 |
| 2006/0022955 A1 * | 2/2006 | Kennedy | 345/173 |
| 2006/0026535 A1 * | 2/2006 | Hotelling et al. | 715/863 |
| 2006/0055670 A1 * | 3/2006 | Castrucci | 345/157 |
| 2006/0085767 A1 * | 4/2006 | Hinckley et al. | 715/863 |
| 2006/0097991 A1 * | 5/2006 | Hotelling et al. | 345/173 |
| 2007/0040810 A1 * | 2/2007 | Dowe et al. | 345/173 |
| 2007/0057930 A1 * | 3/2007 | Iwema et al. | 345/179 |
| 2007/0096945 A1 * | 5/2007 | Rasmussen et al. | 340/995.1 |
| 2007/0118520 A1 * | 5/2007 | Bliss et al. | 707/5 |
| 2007/0180392 A1 * | 8/2007 | Russo | 715/765 |
| 2007/0234223 A1 * | 10/2007 | Leavitt et al. | 715/762 |
| 2007/0252821 A1 * | 11/2007 | Hollemans et al. | 345/173 |
| 2008/0208456 A1 * | 8/2008 | Jouline et al. | 701/208 |
| 2008/0222569 A1 * | 9/2008 | Champion et al. | 715/834 |
| 2008/0229245 A1 * | 9/2008 | Ulerich et al. | 715/834 |
| 2008/0231610 A1 * | 9/2008 | Hotelling et al. | 345/173 |
| 2008/0235610 A1 * | 9/2008 | Dettinger et al. | 715/769 |
| 2009/0037813 A1 * | 2/2009 | Newman et al. | 715/702 |
| 2009/0146968 A1 * | 6/2009 | Narita et al. | 345/173 |
| 2009/0187842 A1 | 7/2009 | Collins | |
| 2009/0327955 A1 * | 12/2009 | Mouilleseaux et al. | 715/810 |
| 2009/0327963 A1 * | 12/2009 | Mouilleseaux et al. | 715/834 |
| 2009/0327964 A1 * | 12/2009 | Mouilleseaux et al. | 715/834 |
| 2010/0100849 A1 * | 4/2010 | Fram | 715/835 |
| 2010/0185985 A1 * | 7/2010 | Chmielewski et al. | 715/834 |
| 2010/0192101 A1 * | 7/2010 | Chmielewski et al. | 715/834 |
| 2010/0192102 A1 * | 7/2010 | Chmielewski et al. | 715/834 |
| 2010/0192103 A1 * | 7/2010 | Cragun et al. | 715/834 |
| 2010/0217514 A1 * | 8/2010 | Nesbitt | 701/200 |
| 2010/0251179 A1 * | 9/2010 | Cragun et al. | 715/834 |
| 2010/0251180 A1 * | 9/2010 | Cragun et al. | 715/834 |
| 2010/0299637 A1 * | 11/2010 | Chmielewski et al. | 715/834 |
| 2010/0306702 A1 * | 12/2010 | Warner | 715/811 |
| 2011/0066980 A1 * | 3/2011 | Chmielewski et al. | 715/834 |
| 2011/0066981 A1 * | 3/2011 | Chmielewski et al. | 715/834 |
| 2011/0184637 A1 * | 7/2011 | Jouline et al. | 701/200 |
| 2011/0184638 A1 * | 7/2011 | Jouline et al. | 701/200 |
| 2011/0319169 A1 * | 12/2011 | Lam et al. | 463/42 |
| 2012/0162265 A1 * | 6/2012 | Heinrich et al. | 345/661 |
| 2012/0185789 A1 * | 7/2012 | Louch | 715/769 |
| 2012/0326993 A1 * | 12/2012 | Weisman | 345/173 |
| 2013/0067332 A1 * | 3/2013 | Greenwood et al. | 715/720 |
| 2013/0120274 A1 * | 5/2013 | Ha et al. | 345/168 |
| 2013/0176298 A1 * | 7/2013 | Lee et al. | 345/419 |
| 2014/0066017 A1 * | 3/2014 | Cho | 455/411 |

* cited by examiner

SYSTEM, METHOD AND GRAPHICAL USER INTERFACE FOR CONTROLLING A GAME

CROSS-REFERENCE TO RELATED APPLICATIONS

This application is a continuation of, claims priority to and the benefit of U.S. application Ser. No. 13/445,783, filed on 12 Apr. 2012, currently pending, the disclosure of which is incorporated herein by reference in its entirety.

BACKGROUND

1. Field

The present disclosure generally relates to user interfaces, and, more specifically, to graphical user interfaces for gaming systems.

2. Brief Description of Related Developments

Currently, examples of computing devices include tablet computers such as iPads, and smart phones, including Apple's iPhone®, Google's Android® phone, and Symbian® phones. These computing devices have extremely user-friendly interfaces, for enabling easy and quick interaction with users thereof. Most of these devices incorporate touch-sensitive screens for receiving users' inputs and facilitate smooth user interaction. Gaming software is employed in many of these devices for leisure purposes. An important aspect of a gaming system is an ease with which a user can enter desired inputs and interact with the user interface of the device on which he/she plays a game. For devices that lack a touch-screen facility incorporated therein, the only possible ways of interaction of the user while playing a game on such devices, is by clicking an associated mouse, using associated keyboard functions/keys to operate, or using associated joysticks. The experience with the 'point and click' or 'joystick' incorporated in many lower-grade electronic devices is incompatible and often time consuming, while playing a game. Specifically, there are specific games where a user/player needs to use clicking, pointing, tapping and dragging operations frequently, and often at different spots, which is hard to operate through a mouse or a joystick. For example, in a typical gaming environment, where a user obtains points by building blocks on certain spatial locations of the gaming interface, operations like tapping and clicking multiple times, degenerates the screen, and often deteriorates it by producing scratches or dirt, for example, in cases where clicking operation is performed through fingers on a touch-sensitive screen.

Therefore, considering the aforementioned problems, there exists a need for a better and highly congenial graphical user interface for a gaming system, while playing a game on a computing device.

SUMMARY

The present disclosure seeks to provide an extremely compatible graphical user interface that facilitates an easy user interaction while the user plays a game on a computing device.

In one aspect, the disclosed embodiment is directed to an electronic device. In one embodiment, the electronic device includes a display screen and computing hardware configured to execute a software product, wherein executing the software product generates and renders a graphical user interface on the display screen, the graphical user interface being configured to facilitate user interaction, the computing hardware, graphical user interface and the software product being implemented on a gaming system, the computing hardware being configured to present one or more selectable graphical objects on the graphical user interface; detect a selection of one or more of the selectable graphical objects; detect a selection of an option associated with the selected graphical object; detect a substantially continuous selection of areas along a path on the graphical user interface, wherein the substantially continuous selection comprises detecting a swipe motion over the graphical user interface; and execute an action corresponding to the selected option in one or more areas along the path on the graphical user interface, wherein the gaming system comprises a farming game, the selectable graphical objects of the graphical user interface comprise different spatial regions of a farming environment in which one or more crops are grown, and wherein the options associated with the selected graphical object comprise farming tools.

In another aspect, the disclosed embodiment is directed to a method of facilitating user interactions with a graphical user interface, the graphical interface being generated and rendered on a display of an electronic device, by executing a software product on a computing hardware of the electronic device, the computing hardware, graphical user interface and the software product being implemented on a gaming system, the method comprising including rendering one or graphical objects within the graphical user interface; detecting a selection of one or more of the one or more graphical objects, detecting a selection of an option corresponding to the selected graphical object, the option corresponding to an effect to be applied to a portion of a specific graphical object, or to one or more of the one or more graphical objects; detecting a substantially continuous selection of areas of the graphical user interface along a path by detecting a swipe motion over the graphical user interface; and applying the effect corresponding to the selected option to a portion of a specific graphical object, or to one or more graphical objects corresponding to the path, wherein the gaming system comprises a farming game, the selectable graphical objects of the graphical user interface comprise different spatial regions of a farming environment in which one or more crops are grown, and wherein the selected option comprises a farming tool.

In a further aspect, the disclosed embodiment is directed to a method of interacting with a graphical user interface of an electronic game, the graphical interface being generated and rendered on a display of an electronic device by executing a software product on a computing hardware of the electronic device, the method including rendering a graphical object within a display area of the graphical user interface; detecting a selection of the graphical object within the display area, the selected graphical object having an action or effect associated therewith that can be applied to one or more objects presented within the display area of the graphical user interface; detecting a substantially continuous selection of areas within the display area of the graphical user interface by detecting a swipe motion of the graphical object on or over the one or more objects presented within the display area of the graphical user interface; and applying the action or effect associated with the selected graphical object to the one or more objects in the selected areas; wherein the electronic game comprises a farming game, the one or more objects in the display area of the graphical user interface comprise different regions of a farming environment in which one or more crops are grown, and wherein the selected object comprises a farming device.

The electronic device and method of the present disclosure facilitates easy interaction of a user with a graphical user interface, while playing a game on an electronic device. Moreover, the method avoids the cumbersome operations of clicking or tapping on multiple spots of the interface, while desiring to perform a specific operation, during playing the game.

Additional aspects, advantages, features and objects of the present disclosure will be made apparent from the drawings and the detailed description of the illustrative embodiments construed in conjunction with the appended claims that follow.

DETAILED DESCRIPTION OF ILLUSTRATIVE EMBODIMENTS

The following detailed description discloses aspects of the disclosed embodiments and the ways they can be implemented. However, the description is not intended to define or limit the invention, such definition or limitation being solely contained in the claims appended thereto. Although the best mode of carrying out the invention has been disclosed comprehensively, those in the art would recognize that other embodiments for carrying out or practicing the invention are also possible.

The present disclosure pertains to a graphical user interface for a gaming system, for facilitating easy and quick interaction of a user while playing the game, and for avoiding cumbersome operations contemporarily experienced while using a mouse or a joystick when a game is played on an electronic device.

Gaming systems are incorporated for leisure purposes into many electronic computing devices, including computers, iPads®, mobile phones, tablet computers and smart phones. While playing games on computing devices without a touch-screen facility, including many conventionally available desktop and laptop computers, the major mode of interaction of a player with a gaming system's interface is through input devices, such as mice, certain keys on the keypads, and joysticks coupled to the computing devices. In many games, the player often desires to obtain quick application of certain operations, for which he/she needs to use clicking or tapping operations multiple times, and at different regions of the interface, which is often time consuming. Most contemporary smart phones and tablet computers have now incorporated touch screen displays, and playing games on these devices is comparatively easier. However, while interacting with the touch sensitive screen acting as a tactile surface for the graphical user interface corresponding to a game, multiple clicking or tapping operations at a single or different places may deteriorate the screen. Moreover, the screen often suffers degeneration over a longer period of use, producing scratches and dirt spots on the screen, as a device is used too often for playing games, which is often undesirable. Also, certain operations require consistent clicking and tapping at different locations on the graphical user interface, which takes time to enable the operations.

Figure 1:
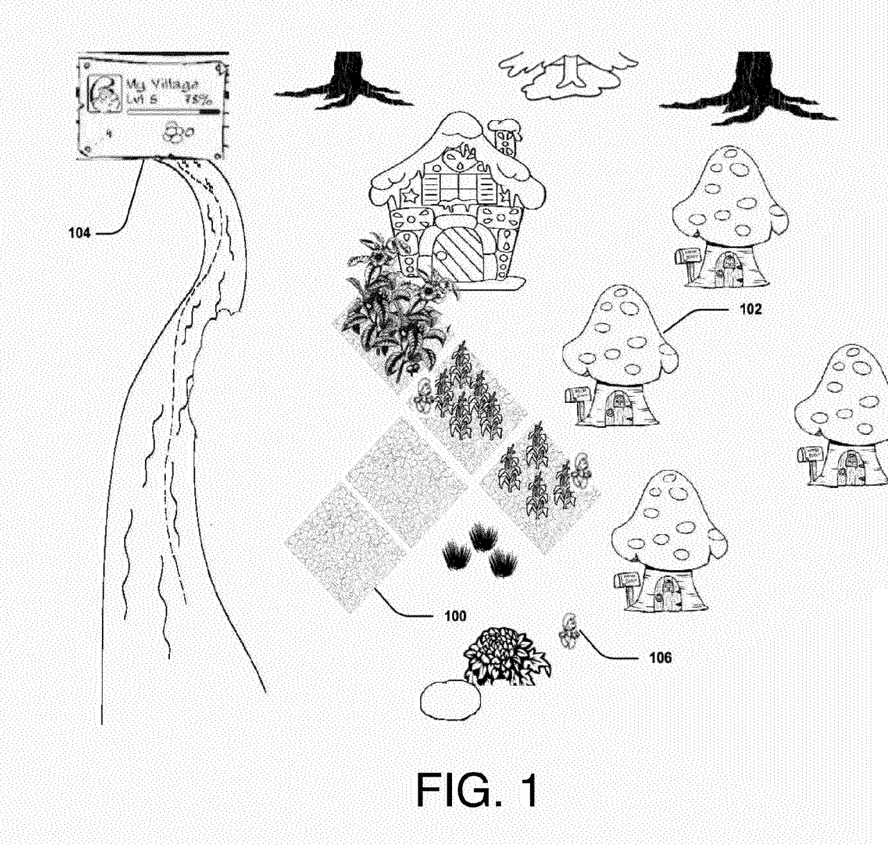
FIG. 1 is an illustration of a graphical user interface as presented on a graphical screen of a computing device operating pursuant to prior art.
Figure 2:
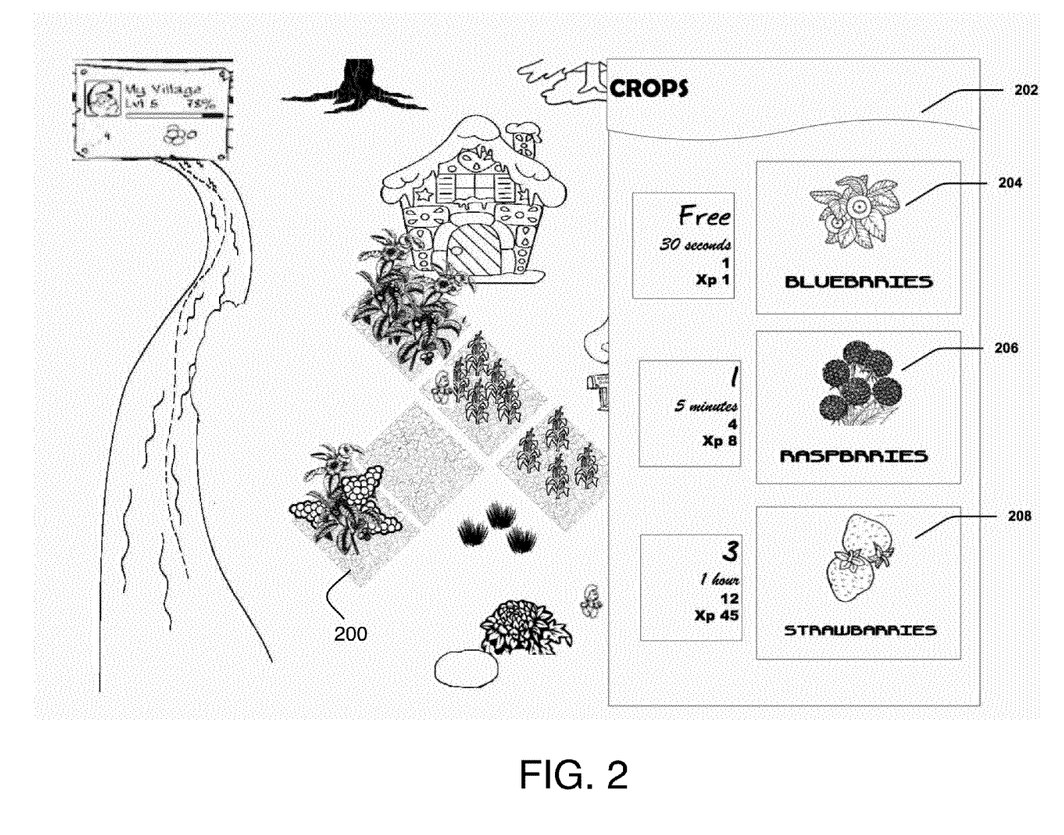
FIG. 2 is an illustration of a graphical user interface as presented on a graphical screen of a computing device operating pursuant to prior art.
Figure 3:
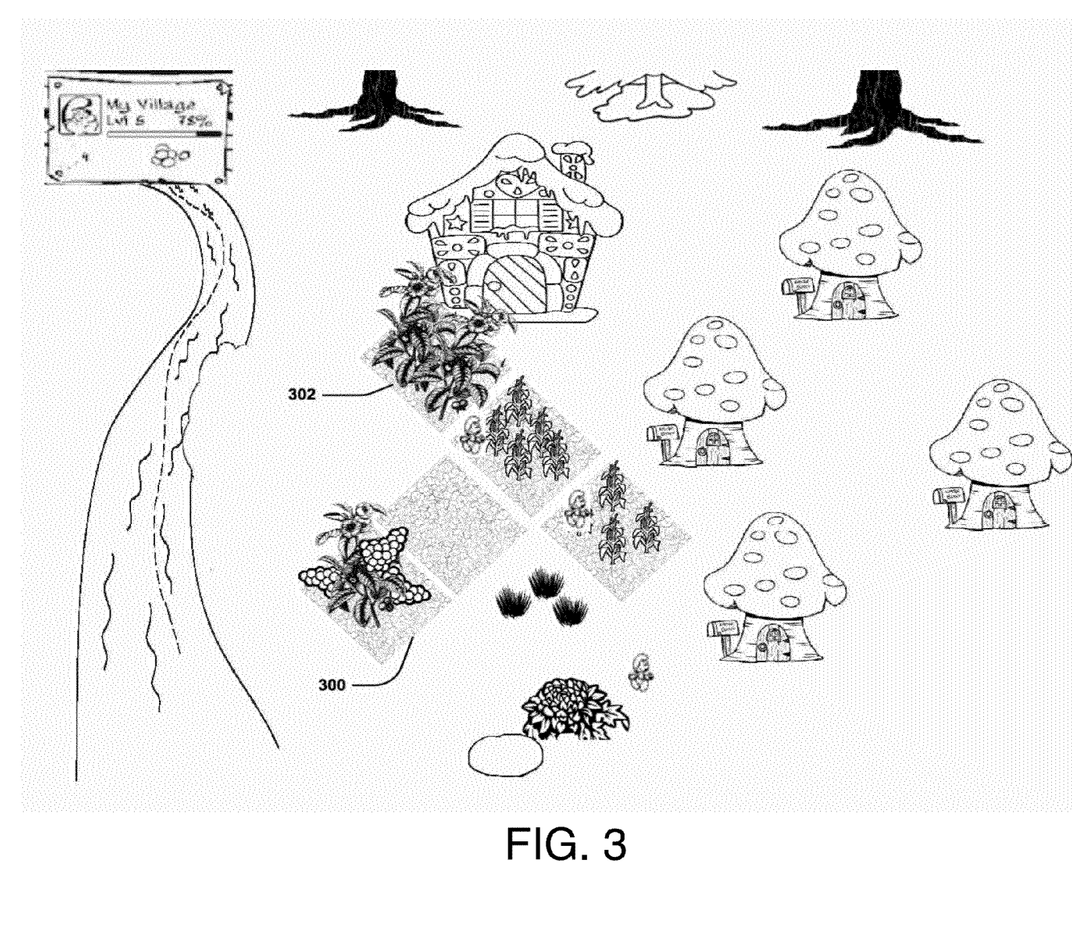
FIG. 3 is an illustration of a graphical user interface as presented on a graphical screen of a computing device operating pursuant to prior art.

FIG. 1 through FIG. 3 depict the graphical user interface corresponding to a farming game. Reviewing these figures FIG. 1 to FIG. 3, they illustrate how different relevant operations are conventionally performed, and cognitive problems faced by a user/player, while performing these operations. FIG. 1 includes a farming field 100, and multiple characters 106 which control the operations on the field 100. The characters 106 are controlled by the user/player, and are moved and allowed to perform different operations within the field 100. A score card 104 is included in a top left corner of the graphical user interface, and different houses 102 are shown, where the characters 106 can rest or hide. The game is concerned with growing different crops/fruits in different suitable parts of the field 100. For example, suppose that the character 106 desires to grow something in a specific region of the field 100. In FIG. 2, the player selects a graphical object 200 corresponding to a location whereat he/she wishes to grow a specific crop. The selection is made by tapping an object 200 through the mouse, or by touching a graphical user interface, if the interface is touch-sensitive. As the player taps or touches the object 200, a menu list 202 appears, containing different selectable options corresponding to different crops that can be grown in that area, for example, raspberries 206, blueberries 204, strawberries 208, etc., as shown. Suppose the player has decided to grow blueberries 204 in one portion, and raspberries 206 in another region of the field. For this, the player selects the relevant options and selects the corresponding regions where he/she wishes to grow them. Continuing further, the updated field 100 of FIG. 1 is shown now in FIG. 3, where blueberries have been shown grown in a region 300, and the raspberries have been shown grown along the region 302. A major problem here arises when the farming field is substantially large, and different crops are required to be grown in different regions of the farming field, quickly. Furthermore, it may be desirous to grow a specific crop in different regions of the field, lying proximal to each other, or in abutment. For enabling this, the user needs to select each of those regions individually, through multiple clicking/tapping operations through the mouse, or by pointing the finger or a touch sensitive object like a pen, on different regions, in a case where the screen of the device is a touch-sensitive screen. In both the cases, the operation consumes considerable time, and specifically, when the operation is performed on a touch-screen through fingers, it may eventually deteriorate the screen of the graphical user interface.

The present disclosure provides an efficient and user-friendly graphical user interface for a gaming system, like the one shown in FIG. 1 to FIG. 3. The interface facilitates easy and quick operations by dragging a pointer object or by performing a swiping action over different graphical objects of the interface.

Figure 4:
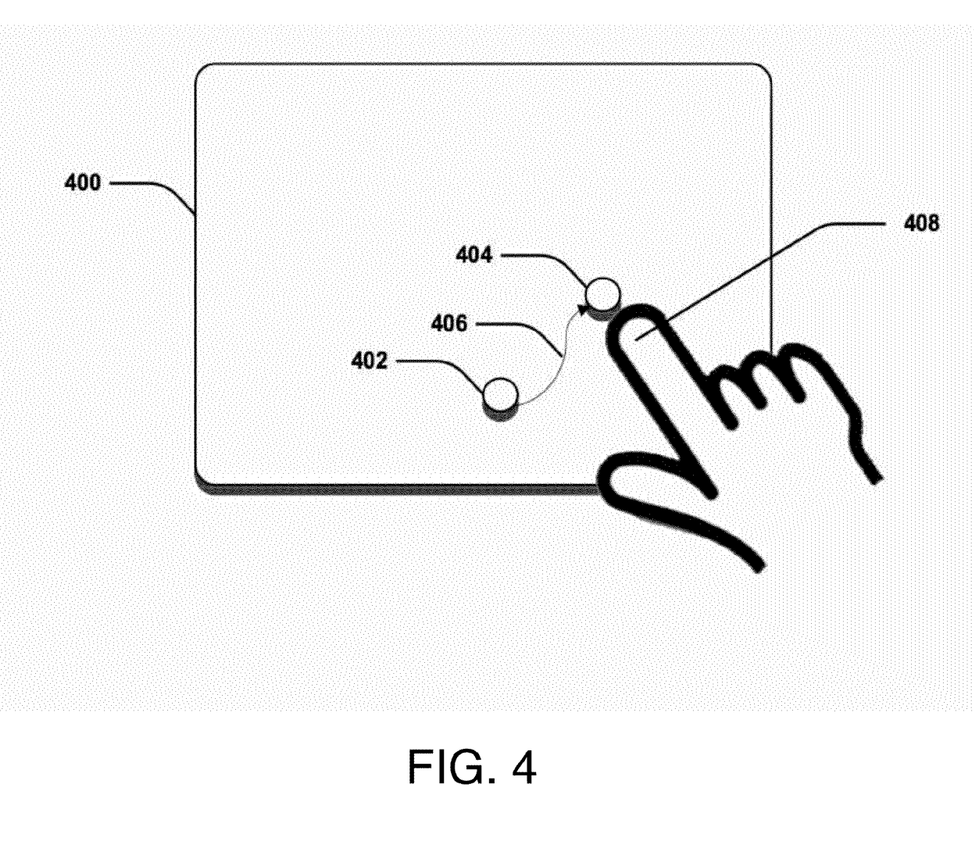
FIG. 4 is an illustration of a manner of operation of a graphical user interface pursuant to the present disclosure.

Specifically, the present disclosure is related to performing a swiping operation on the graphical user interface of a gaming system, while controlling or facilitating operations on the interface. FIG. 4 illustrates the swiping operation that can be performed on the graphical user interface of a gaming system, for controlling operations during playing a game. As shown, for performing the swiping operation of the present disclosure, the finger 408 is initially placed at a desired point 402, and moved along a desired path 406, until a desired destination point 404, in the normal fashion as it is employed to operate menus and handle other applications in electronic devices having touch sensitive screen.

Furthermore, instead of using fingers, the swiping operation can also be performed through a mouse, by pointing and tapping the mouse initially at the point 402, dragging the pointer on the screen along the desired path 406, through the mouse, and finally releasing the mouse at the final position 404. Additionally, any other display sensitive device or an organ, for e.g., a pen or a pointed device, can be used on the screen for performing the swiping operation. Connecting this operation and its advantages applicable to the typical farming game illustrated in FIG. 1 to FIG. 3, suppose a player wishes to grow raspberries all along a wide region represented by the path 406 in FIG. 4, on different blocks on the farming field. Then, he/she just needs to select the raspberry option that pops up, namely appears on the graphical user interface, by pointing on any point over the region, and swipe his/her fingers all along the path 406. This operation will result in easy and quicker growing of the raspberries along the entire path 406.

Figure 5:
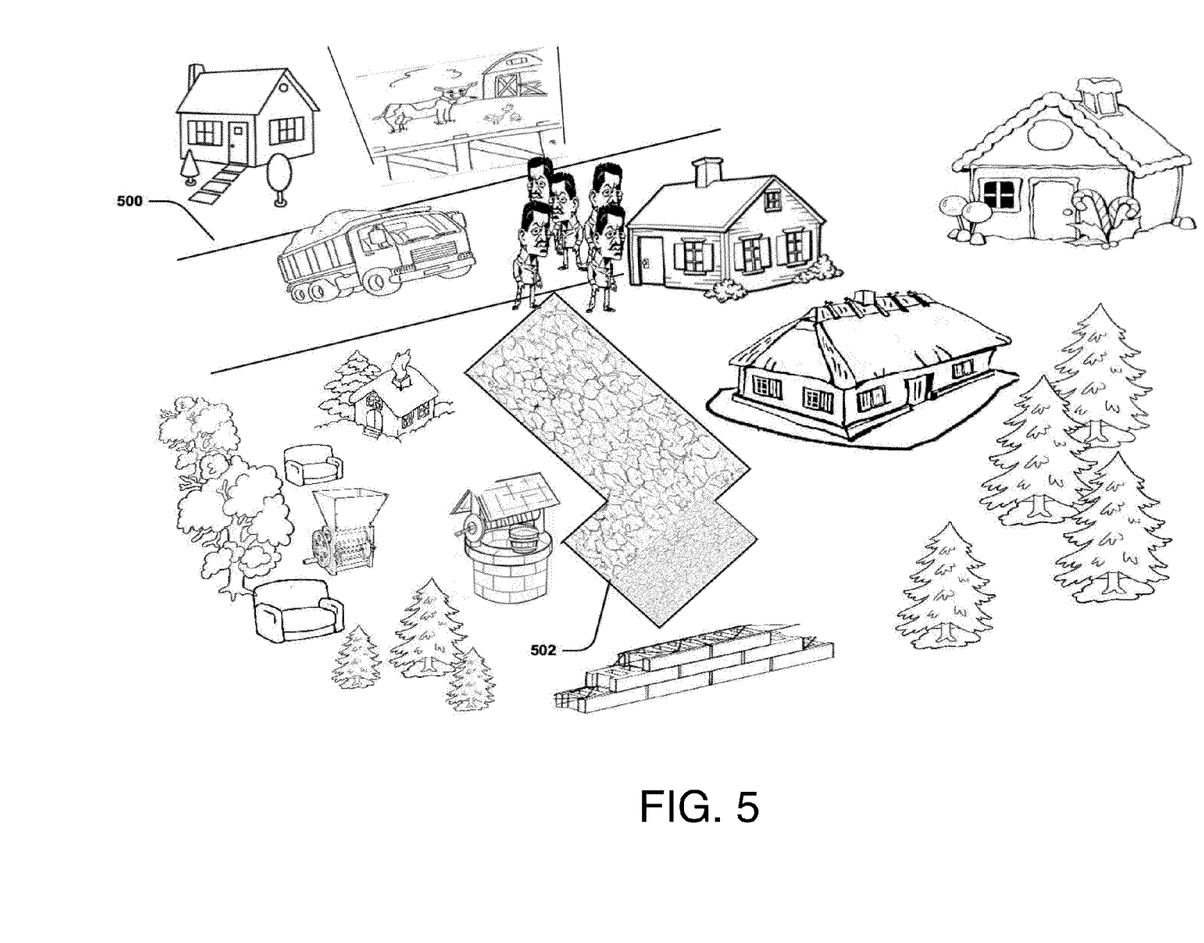
FIG. 5 is an illustration of a graphical user interface of a game executed on a computing device, wherein the graphical user interface is operable to function pursuant to the present disclosure.
Figure 6:
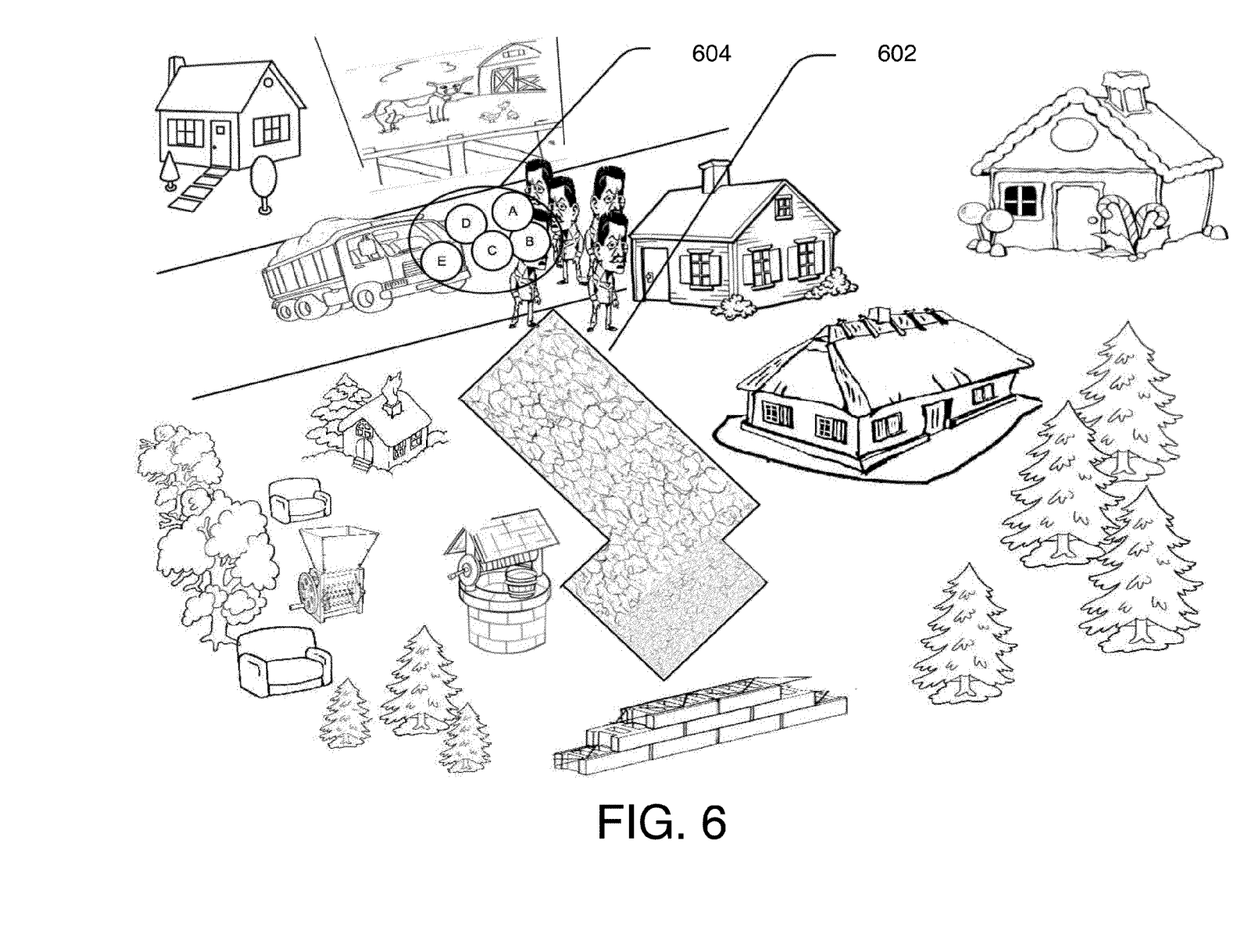
FIG. 6 is an illustration of the graphical user interface of FIG. 5 including invocation of a menu list.
Figure 7:
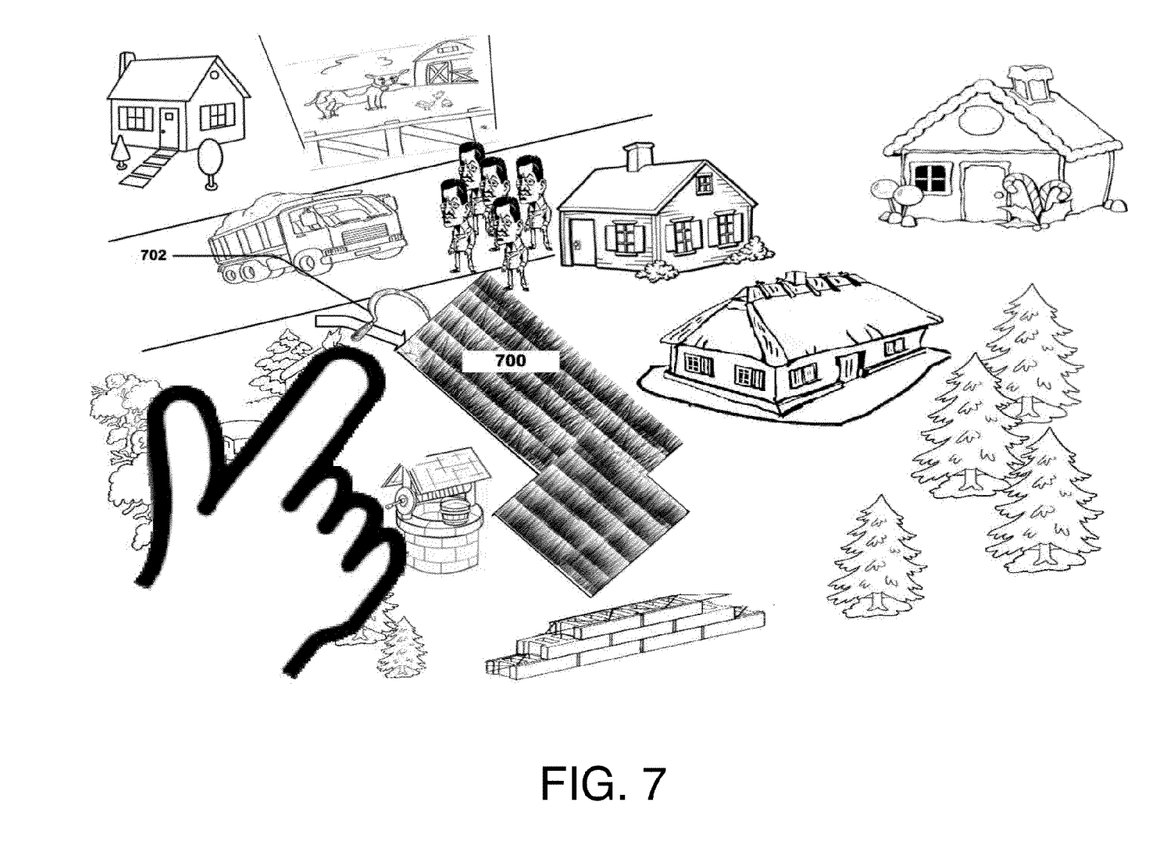
FIG. 7 is an illustration of the graphical user interface of FIG. 5 with a tool symbol activated and in a state to be user-swiped over a region of the user graphical interface.
Figure 8:
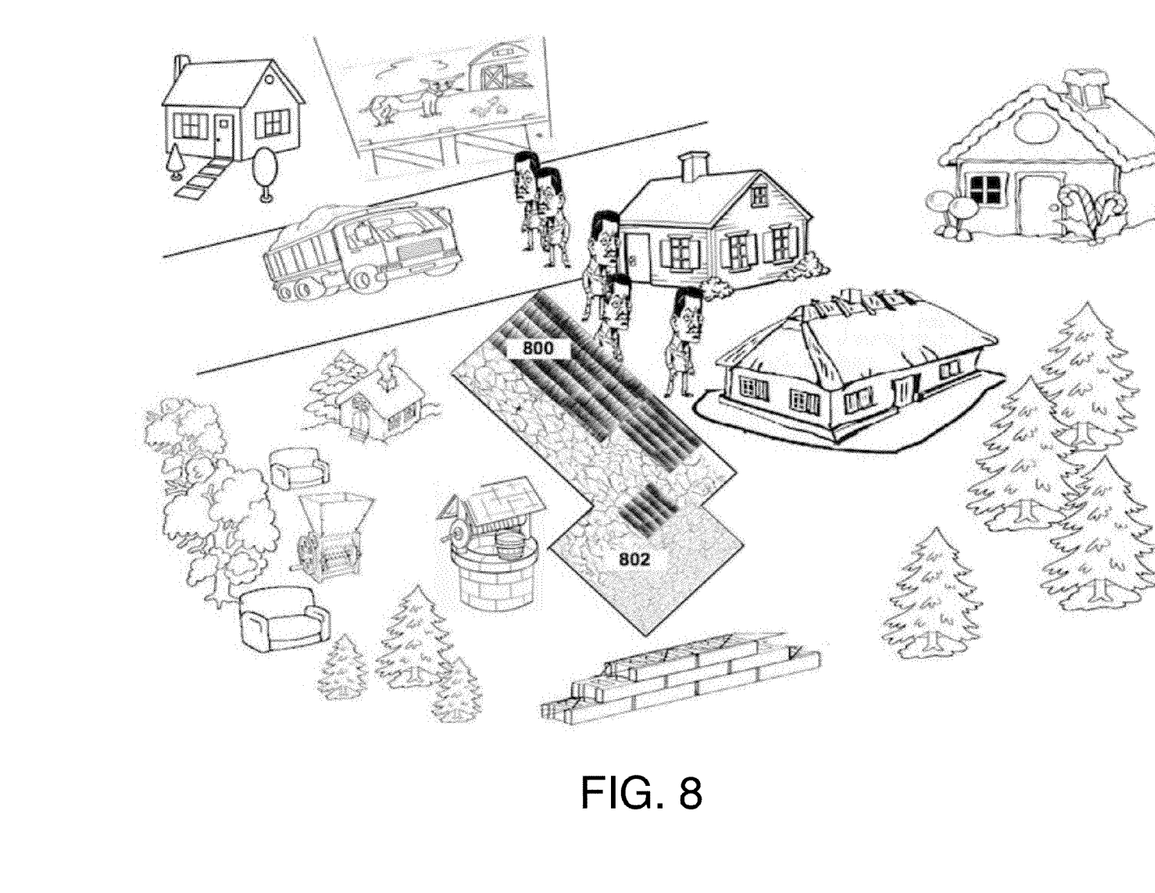
FIG. 8 is an illustration of the graphical user interface of FIG. 7 after an operation has been applied to the region.

FIG. 5 to FIG. 8 are illustrations of the farming field shown earlier in FIG. 1, and these figures illustrate the advantages of the swiping feature supported by the graphical user interface of the present disclosure. As shown in FIG. 5, a view of a farm field game 500 is illustrated, and the object of the game is to score points by producing different products along different regions of the field 502. Growing different crops/products, or performing different operations like harvesting or watering of different sections of the field 502, carry different points to be scored by the user. The field 502 has different segments/blocks that can be modified by the user to score points. These segments/blocks are represented by the different graphical objects of a graphical user interface which presents the gaming environment or the farm field 502 on the display screen of an electronic device on which the game is being played. Continuing further with FIG. 6, for growing a specific product/crop, the user has to click or tap through the mouse, or touch with his finger, or through a display sensitive object (in case where the screen of the electronic device is touch sensitive), at a specific desired position, for example, the one represented by a block 602, as shown. As the user touches the block 602, an item specific menu (ISM) 604 corresponding to the block 602 appears on the graphical user interface. Different blocks may have different item specific menus, corresponding to the possible crops/products that can be grown over them. As shown, the ISM menu 604 corresponding to the block 602 shows different user selectable options such as A, B, C, D and E, which correspond to different crops that can be grown in the field. Each selectable option, when selected, will render a specific tool for growing a different kind of crop/product, for example, maize, corn, carrots, wheat and rice. The embodiment shown in the figures and described herein, is a mere example, and other embodiments incorporating obvious variations may also be possible, thus, not limiting the scope of the present disclosure. For example, there may be other different kind of tools present in the ISM menu, depending on the block/segment of the field clicked, tapped or selected. Specifically, if the selected block 602 is already cultivated, then some of the selectable options appearing in the ISM menu may correspond to pesticide spray, harvesting, pouring water, etc. Proceeding further in conjunction with FIG. 7, if the user decides to cultivate rice, for example, then he/she selects a suitable corresponding option from the ISM menu, and swipes his/her fingers all over the different blocks/segments of the field, wherever he/she desires to grow the rice. Eventually, as shown, the cultivated rice appears all over the region 700 of the farm field, where the user has swiped his/her fingers, or dragged the mouse. As a further example to illustrate the application of swiping motion to other operations, if the user later wishes to harvest the grown rice in certain areas of the region 700, then he/she taps, clicks or touches the region 700, and one of the tools appears in another popping ISM menu, for sickle operation, as shown by the tool 702. Continuing further in conjunction with FIG. 8, the user points his/her finger over the sickle tool, and swipes the finger over regions of the field where he/she wants to harvest the grown rice. Eventually, as shown, the user is successful in harvesting and collecting rice from areas 802, and has intentionally left the other areas 800 free from being harvested.

Emphasizing the advantages of the application of the swiping feature in the graphical user interface of a gaming system, as compared to the prior-art solutions illustrated before through FIG. 1 to FIG. 3, all such operations like harvesting or cultivating in a farm field, for example, are easily executed through the extremely quick and easily operable swiping action, which just takes a fraction of a second and avoids multiple clicking or tapping at different points on the interface, as was undertaken in the prior-art gaming system illustrated earlier. This eliminates any effects like deterioration of the display screen if the screen is touch sensitive, or avoids any complexities in performing different operations, irrespective of how big the farm field may be.

Figure 9:
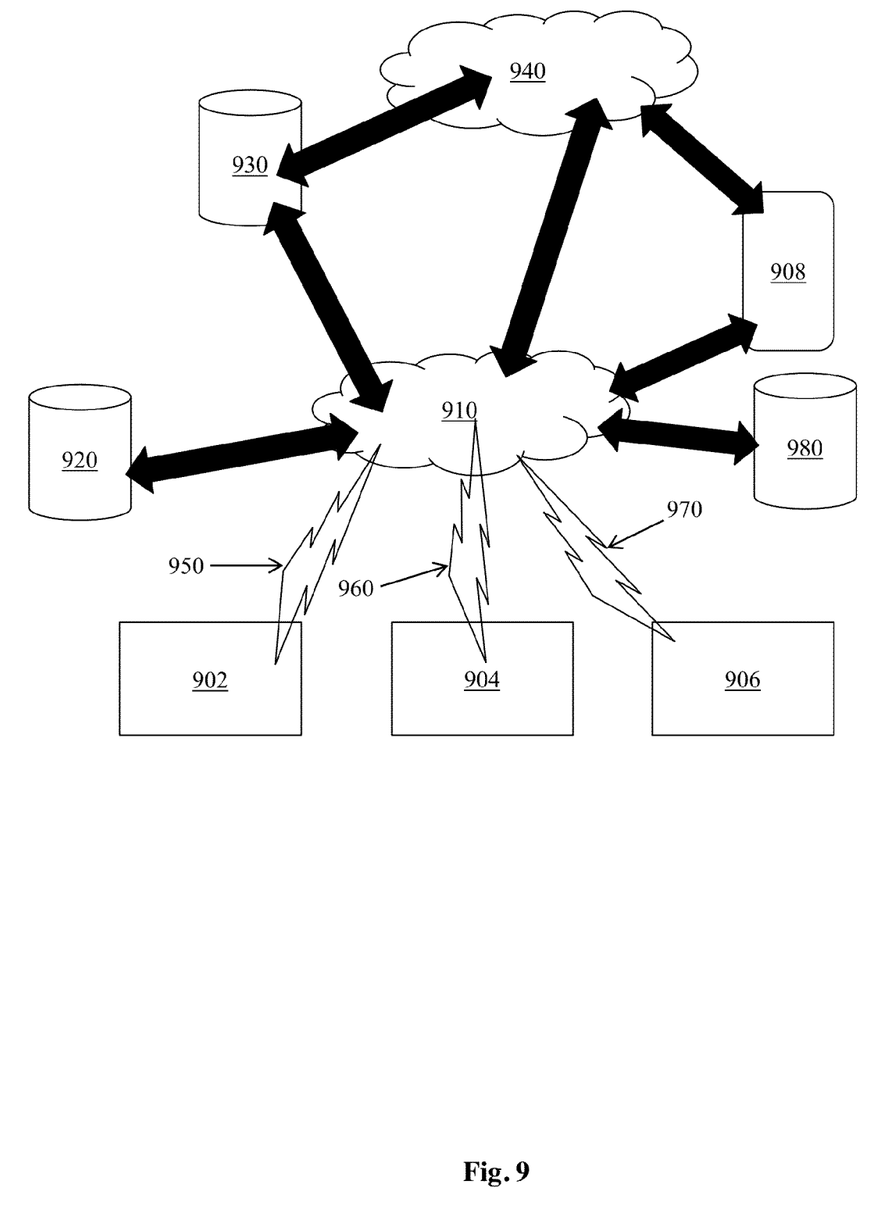
FIG. 9 is an illustration of a communication network including a server and a computing device arranged to implement the method of present disclosure.

FIG. 9 is an illustration of an exemplary environment for implementing the method and system in accordance with the present disclosure. A plurality of electronic devices 902, 904, 906 and 908 are shown, through which a user can connect to one of the different gaming servers 910 and 940, through one of the multiple networks represented by 950, 960 and 970. The servers 910 and 940 can be single or multiple servers located centrally or distributed as cloud service/servers in the cloud. The electronic devices 902, 904, 906 or 908, can be any suitable electronic devices having a computing hardware capable of supporting and executing a software product corresponding to a gaming system. Typical examples of the illustrated electronic devices may include a desktop computer, a laptop computer, a tablet computer, a smart phone including the popularly known iPhones®, Android Phone® etc., an iPad, etc. Furthermore, any of the electronic devices can have the touch-sensitive screen for obtaining user inputs through a touching operation, and some of them may also be coupled to, and operable through conventional devices such as a mouse, a joystick, a keyboard, etc. Moreover, the different electronic devices 902, 904, 906 and 908, are commonly connected to each other through either of the servers 910 and 940, through suitable networks. The networks 950, 960 and 970, etc., may be Wireless networks, such as a Wireless Local area network (WLAN), Local area networks (LAN), cellular networks, for example, 2G network, 3G network, Internet, etc. Further, any of the electronic devices may also use its own Bluetooth network and connect to a Bluetooth server, to synchronize with the other electronic devices. The shown exemplary environment supports multiplayer gaming too, by facilitating multiple users to be online, connecting through a suitable network, and synchronizing with each other. Further, multiple databases, as shown by modules 920, 930, etc., are coupled to different servers, and information related to the gaming environment is continuously stored in these databases, when the different users are online for multiplayer gaming.

For a single player gaming, a user logs on through any of the electronic devices 902, 904, 906 or 908, and connects to one of the gaming servers 910 or 940, through a suitable network, for example via the Internet and/or a wireless communication network. As the user logs on, and executes the gaming software on the computing hardware of the specific device that he/she utilizes, for example, device 902, a graphical user interface corresponding to the game is generated, and is rendered on the display screen of the device 902. The graphical user interface presents different graphical objects on the display screen of the device 902. The graphical objects may be represented by different blocks/segments of the graphical user interface, on which different operations corresponding to the game being played, can be performed. Such blocks/segments, being representative of the graphical objects of the graphical user interface, have been illustrated earlier in the previous figures depicting the view of a farming game. Moreover, a point object (cursor) movable over the different graphical objects appears on the graphical user interface, for controlling the gaming operations. If the device 902 does not have a touch-sensitive screen, the pointer object may be controllable through a mouse, a joystick or a set of keyboard buttons, coupled to the device 902 (though not shown). Furthermore, if the device 902 has a touch-screen functionality incorporated therein, the same controlling operations can also be performed by swiping or tapping/clicking through fingers or any display sensitive item, like any other pointing organ, a pen, or a pencil.

Another database 980, coupled to the gaming server 910, serves as a back end database for the gaming server 910. As the user of the device 902 starts playing the game, typical actions and gestures performed by the user, are recorded in the of back end server 980. Specifically, such actions are interpreted through the gaming server 910, and are sent as messages to the back end server 980, which eventually maintains a log of, and a backup for the played game. Such messages are optionally in the form of data packages sent over an Internet connection through which the device 902 is connected to the server 910, or sent over any other wireless or wired connection connecting the device 902 to the server 910 as aforementioned. Typical elements of such messages for maintaining a back end for the game, may include a header, a payload and a checksum. The checksum can be a function of the payload, or it may be a unique user identifier, like the username, etc. The advantage of including the checksum in back end maintaining message, is the possibility of avoiding prospective frauds while playing the game. Those skilled in the art will understand that an appropriate checksum function or a checksum algorithm may be applied to the collected digital data, while the game is being played, to obtain the checksum. Further, the checksum corresponding to a specific data can be recomputed at any point of time, and compared to the stored checksum, to avoid possible frauds. The back end messages received by the server 910 are also sent to the other databases 920 and 930 of the server 910. In these databases, these back end messages are used to maintain a continuous logic that represents the status of the game, for example, the exact score of the player updated with time, and the stage of the game that the player has already reached. With a continuous receipt of the back end messages by the databases 920 and 930, a regular updating of the game status is undertaken within the these server databases 920 and 930, eventually, with time. This ensures facilitating the resumption of the game to its last status, in cases where the device 910 unexpectedly shuts down, or the user changes the gaming terminal, or he/she intentionally quits playing for a certain period, and logs in at some other time, such a possibility of resumption assists to enhance user satisfaction with the graphical user interface.

Though only two servers 910 and 940 have been shown, there can be multiple gaming servers coordinating with, and connected to each other, for implementing the gaming environment in accordance with the present disclosure. Moreover, the environment as shown in FIG. 9 is capable of implementing a thin client game, i.e., written in a computer program that is partially independent in its computational roles, wherein a part of the gaming logic may be stored in any of the servers 910 and 940, and a part of it may be stored in the gaming terminal. The depicted environment also supports a thick client game, i.e., written in a solely independent computer, wherein the entire gaming logic may be stored in the gaming terminal. Furthermore, the game is optionally completely web-based too, wherein most of the gaming logic may be stored in any of the servers 910 or 940.

Although, the gaming system implementable through the illustrated gaming environment, has been described for the case when a single user logs on to any of the electronic devices 902, 904, 906 or 908, the same gaming environment is capable of supporting multiplayer gaming, wherein different users may log on through different electronic devices, and synchronize with each other by connecting concurrently through any of the common gaming servers 910 and 940, through suitable networks as aforementioned, and share a common graphical user interface representing the ongoing game. In such embodiments, the graphical user interface rendered on the display screens of the different electronic devices, is regularly updated, concurrently, through the logic data stored in the databases 920 and 930 of the gaming servers, at the back end.

Figure 10:
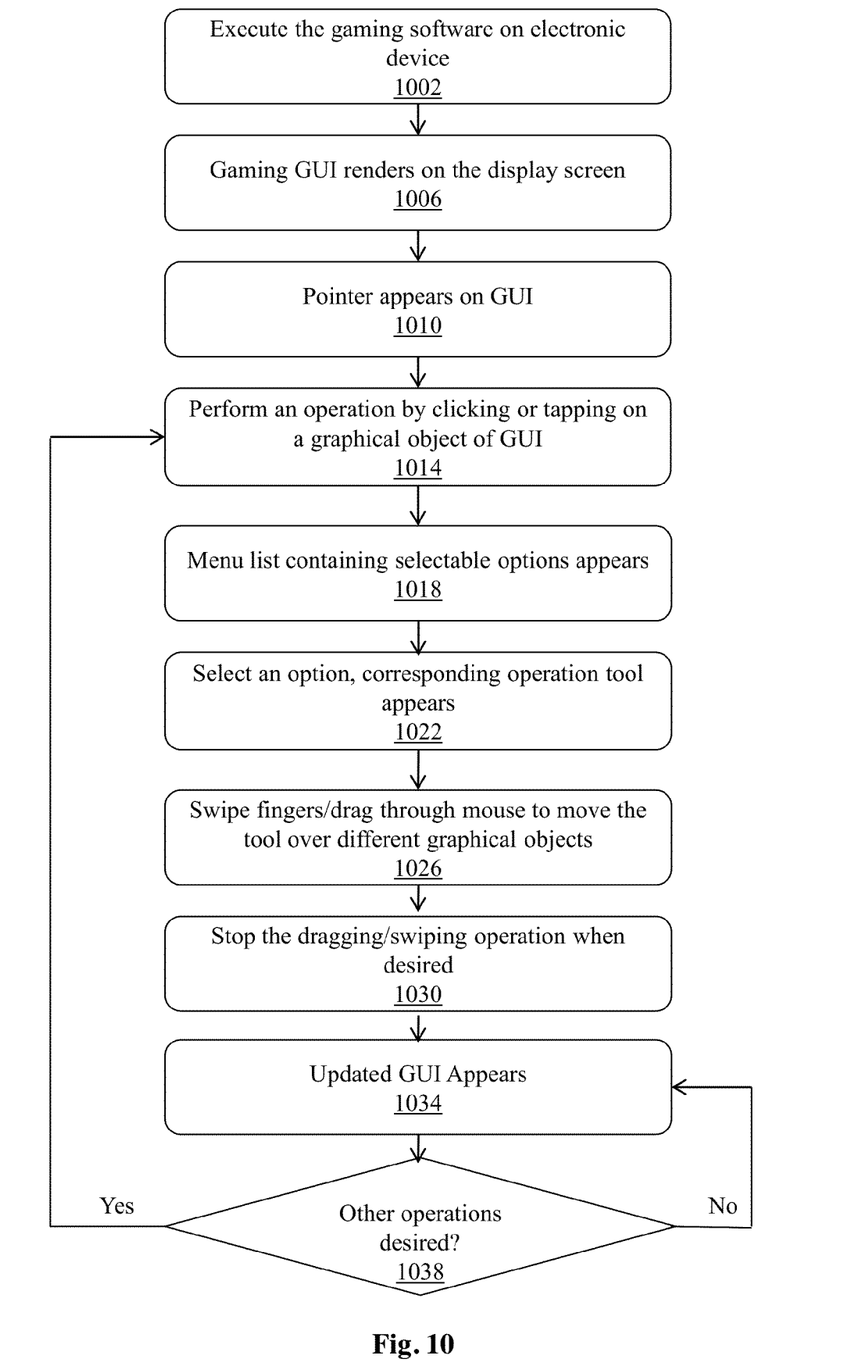
FIG. 10 illustrates an exemplary method for facilitating easy interaction of a user with a graphical user interface, in accordance with the present disclosure; and FIG. 11A

In FIG. 10, there is illustrated a method of facilitating easy interaction of a user with a graphical user interface corresponding to a gaming system, in accordance with the present disclosure. At a step 1002, a user playing a game on a specific electronic device, executes the gaming software on the electronic device, to launch the game. As aforementioned, the electronic device can be any suitable computing device, or a mobile phone, including a smart phone. To execute the gaming software, the user runs the appropriate computer program corresponding to the game, on the computing hardware of the device. The computing hardware includes the well-known building blocks or peripherals of the computing device, including the central processing unit, the memory (RAM and ROM), the fixed media devices, including the hard disk drive and the RAID array controller, and the removable media devices. Also, the device may be connected to a mouse, a keyboard or a joystick, for executing operations on the device. The software product corresponding to the game is being stored in the hard disk drive of the computing device. Further, at a step 1006, as the user executes the software product for the game, a graphical user interface representing the gaming environment appears on the display screen on the electronic device. As noted previously, and illustrated through the figures depicted earlier, the graphical user interface for the game includes different graphical objects that represents the different blocks/segments of the gaming environment. For example, if the game is a farming game, as described earlier, the graphical objects may represent the different segments/sections of the farming field, where different operations can be performed by the user to score points in the game. At a step 1010, a pointer (cursor) movable on the graphical user interface, over the different graphical objects, appears on the interface. The pointer facilitates interaction of the user with the user interface, for performing different operations on the various graphical objects of the interface. At a step 1014, when the user desires to perform a specific operation, he/she clicks or taps on a specific graphical object of the graphical user interface. Further, if the display screen of the electronic device is a touch-sensitive screen, the user may also press gently through his/her fingers, or any other display-sensitive object, like a pen, over a specific graphical object. In a corresponding farming game example, as illustrated earlier, the user may wish to grow a particular crop in a specific region of the farming field, represented by the graphical user interface. In that case, the user needs to click or tap on the specific segment of the field, where he/she wishes to perform the growing operation. At a step 1018, as the user clicks or taps on a specific graphical object, a menu list containing a set of user selectable options appears on the interface. Such options correspond to different operations that can be performed on the selected graphical object that represent the specific region of the gaming environment. At a step 1022, the user selects the desired option from the menu list. As the selection is performed, a tool for facilitating the selected operation appears on the interface. At a step 1026, to perform the desired operation, the user swipes his/her fingers through a specific path covering all the regions or graphical objects, or thorough a specific portion of a graphical object, where he/she wishes to perform that operation. Further, at this step 1026, the user may also use the mouse, click at a specific point, and drag the pointer all over the different graphical objects of the interface through the mouse, where he/she wishes to perform the operation. Further, the rapidity of application of the operation over the different graphical objects depends on different parameters, for example the speed with which the swiping or dragging operation is performed, the acceleration during swiping, etc. These parameters are directly correlated with the application of the operation over the different graphical objects. Going further, at a step 1030, as the user stops the swiping of the fingers, or the dragging of the pointer through the mouse, the selected operation culminates, and the corresponding tool for that option disappears from the interface. At a step 1034, an updated graphical user interface appears on the display of the device, as the effect corresponding to the selected operation is applied to all the graphical objects over which the user has performed the swiping or dragging operation. At a step 1038, the user decides whether or not any other gaming operation needs to be performed on any of the graphical objects of the interface. If yes, then the method reverts to the step 1014, where the user again selects a specific graphical object, and performs the succeeding steps in a similar manner, including selecting an option from the menu list, and swiping across specific graphical objects.

The method and system of the present disclosure, for facilitating easy interaction of a user with a graphical user interface corresponding to a game, provides substantial benefits while performing different operations in a gaming environment. Further, multiple clicking or tapping through the mouse or fingers, at different points of the screen, are reduced through the support of the swiping feature provided by the interface.

Figure 11A:
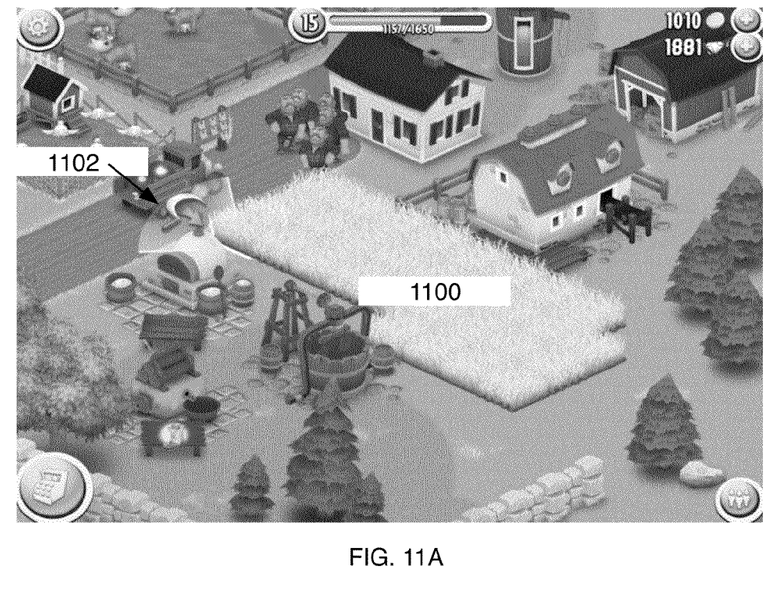
Figure 11B:
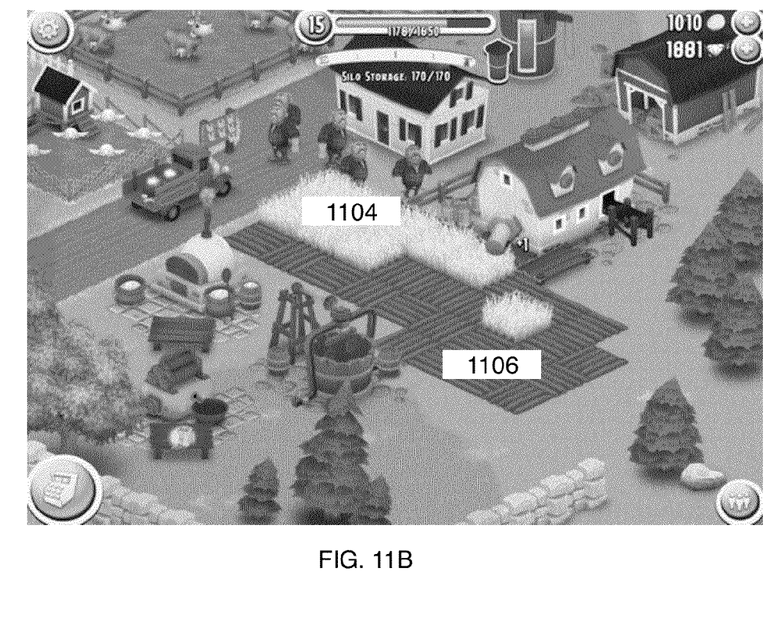
FIG. 11B illustrates exemplary screenshots of an example game using the graphical user interface.

A further example of a game is shown in figures FIG. 11A and FIG. 11B showing a screen shot of a game utilizing swiping feature of the user interface. In figure FIG. 11A a tool 1102 is selected for harvesting wheat 1100. FIG. 11B show a wheat field with part of the wheat cut 1106 and part left untouched 1104.

Though the present disclosure has been described comprehensively, through an exemplary embodiment where it is applicable in a gaming environment, and specifically through the example of a farming game, the disclosure also finds applications in other gaming environments, and, generally, may be applicable to other graphical user interfaces, not pertaining to a gaming system also.

Although the present disclosure has been described comprehensively, in considerable details to cover the possible aspects and embodiments, those skilled in the art would recognize that other versions of the invention may also be possible.

What is claimed is:

1. An electronic device comprising:
 a display screen; and
 a computing hardware configured to execute a software product, wherein executing the software product generates and renders a graphical user interface on the display screen, the graphical user interface being configured to facilitate user interaction, the computing hardware, graphical user interface and the software product being implemented on a gaming system, the computing hardware being configured to:
 present one or more selectable graphical objects on the graphical user interface;
 detect a selection of one or more of the selectable graphical objects;
 detect a selection of an option associated with the selected graphical object;
 detect a substantially continuous selection of areas along a path on the graphical user interface, wherein the substantially continuous selection comprises detecting a swipe motion over the graphical user interface; and
 execute an action corresponding to the selected option in one or more areas along the path on the graphical user interface, wherein the gaming system comprises a farming game, the selectable graphical objects of the graphical user interface comprise different spatial regions of a farming environment in which one or more crops are grown, and wherein the options associated with the selected graphical object comprise farming tools.

2. The electronic device of claim 1, wherein detecting the substantially continuous selection comprises detecting a track of a cursor over the graphical user interface.

3. The electronic device of claim 1, wherein the computing hardware is configured to detect an input corresponding to moving a pointer object, clicking or tapping the pointer object, or swiping a touch sensitive object over or in proximity to the graphical user interface.

4. The electronic device of claim 1, further comprising a user input interface rendered over the graphical user interface, the user input interface being configured to detect an input corresponding to moving a pointer object, clicking or tapping the pointer object, or swiping a touch sensitive object over the graphical user interface.

5. The electronic device of claim 1, the computing hardware being configured to continuously apply the selected option to a portion of a graphical object in one or more areas along the path in response to detecting a swipe action of a touch sensitive object on or in proximity to the graphical user interface over the portion of the graphical object.

6. The electronic device of claim 1, wherein the computing hardware is configured to detect an end of the substantially continuous selection, terminate the action, and remove a visual indicator of the selected option from the graphical user interface.

7. The electronic device of claim 1, wherein the computing hardware is configured to detect a speed of the substantially continuous selection of the one or more areas along the path; and
execute the action corresponding to the selected option at a rapidity that is dependent at least partially on the speed of the substantially continuous selection of the one or more areas along the path.

8. The electronic device of claim 1, wherein the graphical user interface is a touch-sensitive screen.

9. The electronic device of claim 8, comprising a user interface implemented on the touch-sensitive screen as a tactile surface of the touch-sensitive screen.

10. The electronic device of claim 1, wherein the computing hardware is configured to disable the execution of the action corresponding to the selected option, in response to detecting a termination of the substantially continuous selection of one or more areas along a path on the graphical user interface.

11. The electronic device of claim 1, comprising a database for continuously recording and updating the change in status of the one or more graphical objects, the software product being coupled to the database and being configured to resume the status of the one or more graphical objects to their last updated status in the database, in case of interruptions in the operable state of the graphical user interface.

12. The electronic device of claim 1, wherein the electronic device is connected to a server through a network, the graphical user interface being generated temporally concurrently on a plurality of electronic devices to facilitate a plurality of users' interaction with the graphical user interface, wherein each of the graphical user interfaces generated on the plurality of electronic devices are coordinated through the server and updated concurrently on the plurality of electronic devices with time.

13. The electronic device of claim 1, wherein the electronic device comprises a desktop computer, a laptop computer, an iPad, or a smart phone, including an iPhone®, an Android® phone or a Symbian® phone.

14. A method of facilitating user interactions with a graphical user interface, the graphical interface being generated and rendered on a display of an electronic device, by executing a software product on a computing hardware of the electronic device, the computing hardware, graphical user interface and the software product being implemented on a gaming system, the method comprising:
rendering one or graphical objects within the graphical user interface;
detecting a selection of one or more of the one or more graphical objects;
detecting a selection of an option corresponding to the selected graphical object, the option corresponding to an effect to be applied to a portion of a specific graphical object, or to one or more of the one or more graphical objects;
detecting a substantially continuous selection of areas of the graphical user interface along a path by detecting a swipe motion over the graphical user interface; and
applying the effect corresponding to the selected option to a portion of a specific graphical object, or to one or more graphical objects corresponding to the path, wherein the gaming system comprises a farming game, the selectable graphical objects of the graphical user interface comprise different spatial regions of a farming environment in which one or more crops are grown, and wherein the selected option comprises a farming tool.

15. The method of claim 14, comprising configuring the graphical user interface to continue to apply the effect corresponding to the selected option during a time of detection of the substantially continuous selection of areas of the graphical user interface along the path to remove the selected option when the substantial continuous selection is terminated.

16. The method of claim 14, comprising continuously recording and updating a change in status of the one or more graphical objects, coupling the software product to a database, and resuming the status of one or more graphical objects to their last updated status in the database, in case of interruptions in the operations of the graphical user interface.

17. The method of claim 14, comprising:
connecting a plurality of electronic devices to a server through a network;
generating the graphical user interface temporally concurrently on the displays of each of the electronic devices;
coordinating a plurality of graphical user interfaces through the server, and updating them concurrently with time, to facilitate multiple users' interaction and coordination with the plurality of graphical user interfaces.

18. The method of claim 17, wherein the plurality of graphical user interfaces comprises a gaming system, the method being implemented to facilitate an online multiplayer gaming system.

19. A software product recorded on a machine readable data storage medium, the software product being executable on the computing hardware of a computing device, for implementing a method according to claim 14.

20. A method of interacting with a graphical user interface of an electronic game, the graphical interface being generated and rendered on a display of an electronic device by executing a software product on a computing hardware of the electronic device, the method comprising:
rendering a graphical object within a display area of the graphical user interface;
detecting a selection of the graphical object within the display area, the selected graphical object having an action or effect associated therewith that can be applied to one or more objects presented within the display area of the graphical user interface;
detecting a substantially continuous selection of areas within the display area of the graphical user interface by detecting a swipe motion of the graphical object on or over the one or more objects presented within the display area of the graphical user interface; and
applying the action or effect associated with the selected graphical object to the one or more objects in the selected areas;
wherein the electronic game comprises a farming game, the one or more objects in the display area of the graphical user interface comprise different spatial regions of a farming environment in which one or more crops are grown, and wherein the selected object comprises a farming device.

* * * * *